(12) United States Patent
Li et al.

(10) Patent No.: US 11,615,615 B2
(45) Date of Patent: Mar. 28, 2023

(54) METHOD AND APPARATUS FOR EXTRACTING MOUNTAIN LANDSCAPE BUILDINGS BASED ON HIGH-RESOLUTION REMOTE SENSING IMAGES

(71) Applicant: SOUTHEAST UNIVERSITY, Jiangsu (CN)

(72) Inventors: Zhe Li, Nanjing (CN); Yukun He, Nanjing (CN); Yuning Cheng, Nanjing (CN); Xiang Zhou, Nanjing (CN); Kaiyu Zhao, Nanjing (CN); Xiao Han, Nanjing (CN); Feifei Chen, Nanjing (CN); Shuang Song, Nanjing (CN); Xinyi Lu, Nanjing (CN); Xiaoshan Lin, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 149 days.

(21) Appl. No.: 17/153,967

(22) Filed: Jan. 21, 2021

(65) Prior Publication Data
US 2021/0166020 A1    Jun. 3, 2021

Related U.S. Application Data

(63) Continuation of application No. PCT/CN2020/076624, filed on Feb. 25, 2020.

(30) Foreign Application Priority Data

Jun. 25, 2019   (CN) .......................... 201910553177.7

(51) Int. Cl.
*G06V 20/10* (2022.01)
*G06T 7/174* (2017.01)

(52) U.S. Cl.
CPC ............ *G06V 20/188* (2022.01); *G06T 7/174* (2017.01); *G06V 20/10* (2022.01);
(Continued)

(58) Field of Classification Search
CPC ...... G06V 20/188; G06V 20/10; G06V 10/28; G06V 20/176; G06V 10/267; G06T 7/174
(Continued)

(56) References Cited

FOREIGN PATENT DOCUMENTS

| CN | 104616015 A | * | 5/2015 | ......... G06K 9/00637 |
| CN | 104616015 A | | 5/2015 | |

(Continued)

*Primary Examiner* — Ayodeji O Ayotunde
(74) *Attorney, Agent, or Firm* — ArentFox Schiff LLP; Michael Fainberg (57) ABSTRACT

The present invention discloses a method and an apparatus for extracting mountain landscape buildings based on high-resolution remote sensing images. The method comprises: segmenting a remote sensing image, and extracting non-vegetation areas from the remote sensing image by using NDVI; segmenting the non-vegetation areas, and extracting building areas by using NDBI; segmenting the building areas again, and calculating a normalized difference build shadow index NSBI of each patch; calculating NSBI separator of each patch in the non-vegetation areas and setting a separator threshold, and extracting landscape building areas based on the threshold. In the present invention, by introducing a near infrared band in the remote sensing image spectrum, in which there is a significant difference between shadows and non-shadows, the influence of large shadow areas in mountainous shady areas in the remote sensing image on the result of extraction is reduced.

12 Claims, 6 Drawing Sheets

(52) U.S. Cl.
CPC .............. *G06T 2207/10036* (2013.01); *G06T 2207/30168* (2013.01); *G06T 2207/30188* (2013.01); *G06V 20/194* (2022.01)

(58) Field of Classification Search
USPC ........................................................ 382/154
See application file for complete search history.

(56) References Cited

FOREIGN PATENT DOCUMENTS

| | | | | |
|---|---|---|---|---|
| CN | 106407940 A | | 2/2017 | |
| CN | 107909607 A | | 4/2018 | |
| CN | 108256534 A | * | 7/2018 | ........... G06K 9/4671 |
| CN | 108256534 A | | 7/2018 | |
| CN | 108596103 A | * | 9/2018 | ......... G06K 9/00637 |
| CN | 110390267 A | | 10/2019 | |

* cited by examiner

METHOD AND APPARATUS FOR EXTRACTING MOUNTAIN LANDSCAPE BUILDINGS BASED ON HIGH-RESOLUTION REMOTE SENSING IMAGES

CROSS REFERENCE TO RELATED APPLICATIONS

The present application is a continuation of International application No. PCT/CN2020/076624, filed Feb. 25, 2020, which claims priority to Chinese Patent Application No. 201910553177.7, filed Jun. 25, 2019, the entire contents of each of which are incorporated herein by reference.

TECHNICAL FIELD

The present invention belongs to the field of digital landscape site exploration, in particular to a method and an apparatus for extracting mountain landscape buildings based on high-resolution remote sensing images.

BACKGROUND

It is of great significance to conveniently and accurately obtain the area and spatial distribution information of the buildings in scenic areas for the development of tourism resources, landscape evaluation of scenic areas and management of existing building resources. Compared with conventional field survey, the remote sensing technology has irreplaceable advantages of high frequency, wide coverage and low cost, which provides an important scientific dimension and quantitative analysis means for the development of contemporary digital landscape, promotes the research on landscape features from a sensual way to a perceptual way and from a qualitative way to a quantitative way, and is of great technological progress significance for improving the quantitative extraction of large-scale scenic landscape features and the research level of conventional landscape digitalization. Especially, the meter-level high-resolution remote sensing technology developed in recent years can be used for accurate identification and extraction. Therefore, it is a very meaningful work to extract landscape buildings in scenic areas.

At present, a supervised classification method is usually used for extraction of landscape buildings in scenic areas based on remote sensing images, i.e., first, samples with typical background features are selected on the basis of background feature analysis; then, a classifier is trained on the basis of a human vision saliency mechanism and curve analysis of remote sensing image; and finally, classification is performed by the classifier. A disadvantage of the such technique is that it requires the samples to cover the extraction area as far as possible, especially in a region where the landscape buildings are interlaced with bare land and roads. Consequently, the efficiency of the analysis process is low, and the accuracy needs to be improved. In addition, most of the buildings in scenic areas are located in mountainous areas and woodlands, the spectral characteristic values of the sunny side and shady side of mountainous areas are quite different owing to shadow difference, and the landscape buildings are small in size and easy to be obscured, the selected samples will be offset consequently, and it is difficult to apply the method to the extraction of building development and evolution in large-scale mountainous scenic areas and multi-temporal remote sensing images. At present, the method with high accuracy is the method of rectangular shape based on a fuzzy algorithm. In the algorithm of extraction of rectangular objects, first, the image is processed with a Canny operator, and low-level image features are extracted from the input image to obtain a linear feature set; then, the linear feature set is perceptually grouped under a principle of perceptual organization to generate a hypothetical rectangular space; finally, a fuzzy mathematic method is used to conduct evidence fusion on several supporting evidences to obtain decision information, and the generated hypothetical rectangle is selected and verified according to the decision information, and finally the structural features of the rectangular object are obtained. Such method has certain advantages for landscape buildings with obvious rectangular shape in a small scope, but it depends on the rectangular shape feature of buildings, and the process is cumbersome and the algorithm cost is high. Therefore, the method is not applicable to the extraction of buildings in numerous scenic areas that are in scattered distribution in practice. Moreover, in the prior art, researches are made extensively on individual buildings in scenic areas at microscopic level, but extraction and analysis are seldom made on building landscape elements in scenic areas and relationships thereof at macroscopic level.

Under the current construction level and conditions, the lack of rapid, accurate and practical guiding research result on extraction of surface landscape elements in landscape architecture planning has become one of the critical factors restricting the development of scientific design of regional landscape architecture planning to a higher level. How to quickly, efficiently and economically learn about the distribution level of present surface landscape elements, such as the horizontal and spatial distribution of landscape buildings in scenic areas, in the aspect of ecological and environmental functions at a macroscopic level has become an unavoidable problem in the process of in-depth construction and rational utilization of landscape architecture planning in mountainous scenic areas.

SUMMARY

Object of the Invention: in view of the drawbacks in the prior art, the present invention provides a method and an apparatus for extracting mountain landscape buildings based on high-resolution remote sensing images, which can quickly and effectively extract building information from high-resolution remote sensing satellite images.

Technical Solution: according to a first aspect of the present invention, a method for extracting mountain landscape buildings based on high-resolution remote sensing images is provided, comprising the following steps:

S1: segmenting a remote sensing image into patches of a first scale by using a first scale parameter A1, calculating a normalized difference vegetation index NDVI of each patch, and extracting the segmented patch with NDVI greater than a first threshold T1 as vegetation areas, while other patches as non-vegetation areas;

S2: segmenting the non-vegetation areas by using a second scale parameter A2 to obtain patches of a second scale, calculating a normalized difference buildup index NDBI of each patch, and judging the patches of a second scale with NDBI greater than a second threshold T2 as building areas, while regarding other patches as non-building areas;

S3: segmenting the non-vegetation areas by using a third scale parameter A3 to obtain patches of a third scale, and calculating a normalized difference build shadow index NSBI of each patch;

S4: calculating a normalized difference build shadow index separator $S_x(NSBI)$ of each patch according to the NSBI, and extracting the areas with a separator greater than a third threshold T3 as landscape buildings;

wherein the first scale parameter A1>the second scale parameter A2>the third scale parameter A3.

Furthermore, the normalized difference build shadow index NSBI is calculated with the following formula:

$$NSBI = NDBI * NIR = \frac{(NIR + R) * NIR}{NIR - R}$$

wherein, NIR is the mean valve of the near infrared band of the current calculated patch, and R is the mean valve of the red band of the current calculated patch.

The normalized difference build shadow index separator $S_x(NSBI)$ is calculated with the following formula:

$$S_x(NSBI) = \frac{\sum_{x_i \in n(x), m_{x_i}(l) < m_x(l)} B(x, x_i)(m_x(NSBI) - m_{x_i}(NSBI))}{\sum_{x_i \in n(x)} B(x, x_i)}$$

wherein, x represents the current calculated patch, n(x) represents a set of all patches adjacent to the current calculated patch, $B(x, x_i)$ is the length of a common side of the current calculated patch x and the adjacent patch $x_i$, and $m_x(NSBI)$ represents the NSBI value of the calculated patch x.

According to the second aspect of the present invention, a computer device is provided, comprising: one or more processors; a memory unit; and one or more programs, which are stored in the memory unit and configured to be executed by the one or more processors, and when the program is executed by the processors, the steps according to the first aspect of the present invention are implemented.

Beneficial effects: with the method provided by the present invention, vegetation areas and non-vegetation areas are effectively separated on the basis of a threshold segmentation method of a normalized difference vegetation index NDVI in the near infrared band by analyzing the spectral characteristics and differences of vegetation in bright areas, vegetation in shadow areas, and non-vegetation areas; the approximate locations of landscape buildings in a scenic area can be delineated by calculating a NDBI; the influence of shadows on a mountain terrain is reduced and landscape buildings and shadow areas are effectively separated by the threshold segmentation method of calculating an NSBI and evaluating the spectral difference enhancement and classification effect; landscape buildings can be distinguished significantly from their adjacent patches by calculating a separator $S_x(NSBI)$, enhancing the spectral relative difference among landscape buildings in bright areas, landscape buildings in shadow areas and shadow intervals, and decreasing the probability of spectral confusion; finally, landscape building extraction is realized with a threshold method. The method provided by the present invention has high robustness to landscape buildings in scenic areas, including landscape building settlements distributed in a scattered form, overcomes the drawback that the influence of terrain can be weakened only partially in the conventional methods and enhances the spectral difference between the ground and the objects, thereby improves the effectiveness of detection of surface elements, especially shadows, and is capable of extracting buildings in large-scale scenic areas under complex mountain terrain and shadow conditions.

DETAILED DESCRIPTION

Hereunder the technical solution of the present invention will be further detailed with reference to the drawings. It should be understood that the following embodiments are only for the purpose of disclosing the present invention in detail and completely, and fully conveying the technical concept of the present invention to the person skilled in the art. The present invention may also be implemented in many different forms and is not limited to the embodiments described here. Terms used in the exemplary embodiments shown in the drawings are not intended to limit the present invention.

In view of the problems that most of the buildings in scenic areas are located in mountainous areas and woodlands, the spectral characteristic values of the sunny side and shady side of mountainous areas are greatly different owing to shadow difference, and the landscape buildings are small in size and may be shaded easily, and the existing technical means have high cost, low efficiency, poor performance, cumbersome process and low accuracy, the present invention provides a method for extracting mountain landscape buildings based on high-resolution remote sensing images, which utilizes the chlorophyll concentration difference between landscape buildings and surrounding vegetation in a scenic area and the brightness difference of building shadows, combines a normalized difference buildup index (NDBI) related with chlorophyll in remote sensing interpretation, a normalized difference shadow index (NDSI) related with brightness, a segmentation-based image interpretation idea and a human vision saliency mechanism, decreases the influence of large shadow areas in mountainous shady areas on the extraction result, puts forth a normalized difference build shadow index (NSBI) separator, obtains a threshold of the NSBI separator with reference to the NSBI, and thereby extracts landscape buildings in the scenic area by means of threshold segmentation of this feature.

Figure 1:
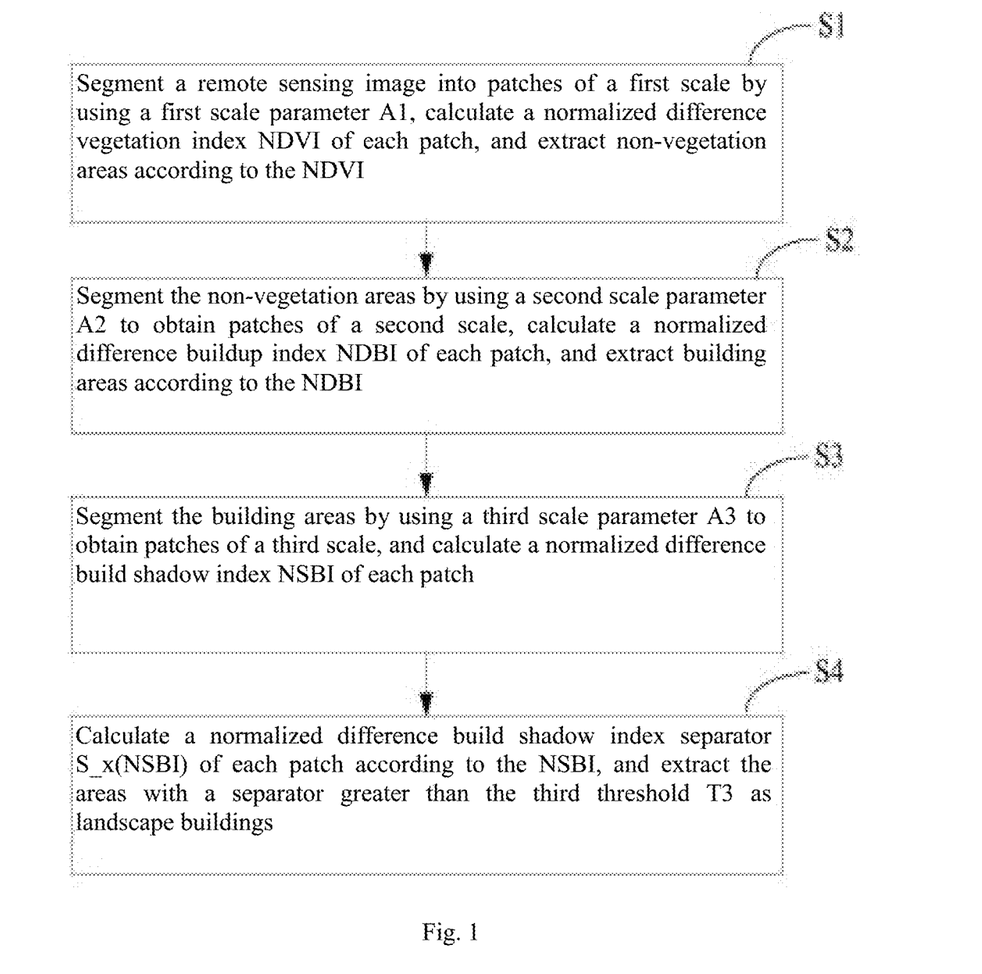
FIG. 1 is a flow chart of the method for extracting mountain landscape buildings based on high-resolution remote sensing images according to the present invention.

With reference to FIG. 1, the method for extracting mountain landscape buildings based on high-resolution remote sensing images comprises the following steps:

step S1: segmenting a remote sensing image into first scale patches by using a first scale parameter A1, calculating a normalized difference vegetation index (NDVI) of each patch, and extracting non-vegetation areas according to the NDVI;

In an embodiment, the remote sensing images of Jizu Mountain Scenic Area and the surrounding areas in Dali, Yunnan, China are processed. The area is a typical scenic area in scattered distribution. The raw high-resolution remote sensing images obtained are in a resolution of 3.2 meters and image size of 1,419 rows x 823 columns, and contain four bands, namely a blue band (0.45 to 0.52 μm), a green band (0.52 to 0.59 μm), a red band (0.63 to 0.69 μm) and a near infrared band (0.77 to 0.89 μm). The objects to be extracted are landscape buildings.

Figure 2:
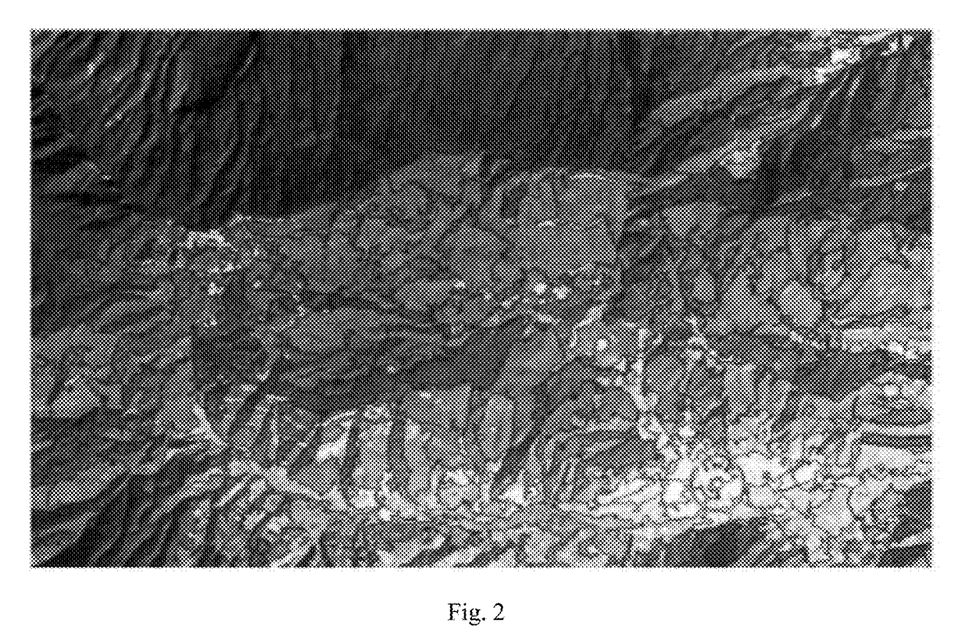
FIG. 2 is a remote sensing image (partial) of Jizu Mountain Scenic Area at a segmentation scale of 100 according to an embodiment of the present invention.

The image segmentation algorithm may use algorithms such as Multiresolution Segmentation algorithm or simple linear iterative clustering (SLIC) algorithm. The first scale parameter A1 employs a larger scale, and the value range is preferably within 80 to 150. In this embodiment, the Multiresolution Segmentation algorithm is used, and the scale parameter A1 is set to 100, as shown in FIG. 2.

Figure 3:
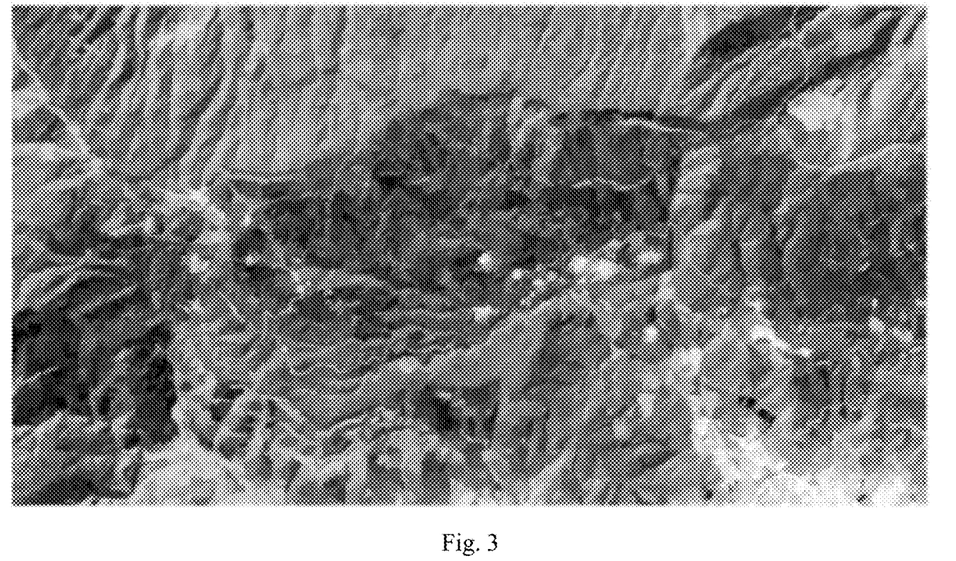
FIG. 3 is a NDVI analysis view of Jizu Mountain Scenic Area and surrounding areas according to an embodiment of the present invention.

After image segmentation, a normalized difference vegetation index NDVI of each patch is calculated with the following formula:

$$NDVI = \frac{NIR - R}{NIR + R}$$

wherein, NIR is the mean valve of the near infrared band of the current calculated patch, and R is the mean valve of the red band of the current calculated patch. $-1 <= NDVI <= 1$, wherein a negative value indicates that the ground is covered by cloud, water, snow, etc., and is highly reflective to visible light; value 0 indicates that there are rocks or bare soil, etc., and NIR and R are approximately equal to each other; a positive value indicates that there is vegetation coverage, which increases with the increasing of coverage. Through threshold segmentation based on the near infrared band and the NDVI, vegetation areas and non-vegetation areas can be separated effectively. The obtained NDVI analysis view is shown in FIG. 3.

Figure 4:
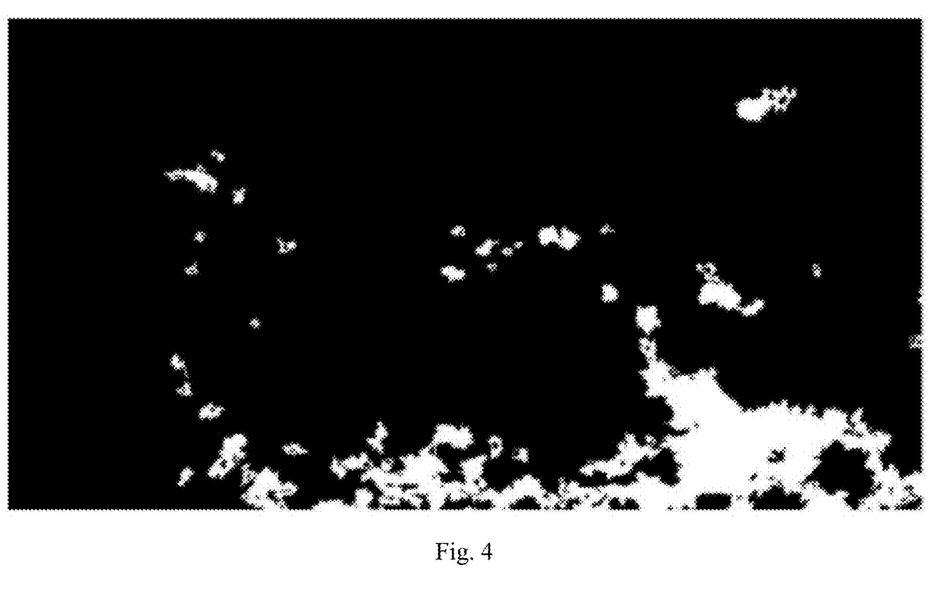
FIG. 4 is an analysis view of extraction with an OTSU algorithm with a first threshold according to an embodiment of the present invention.
Figure 5:
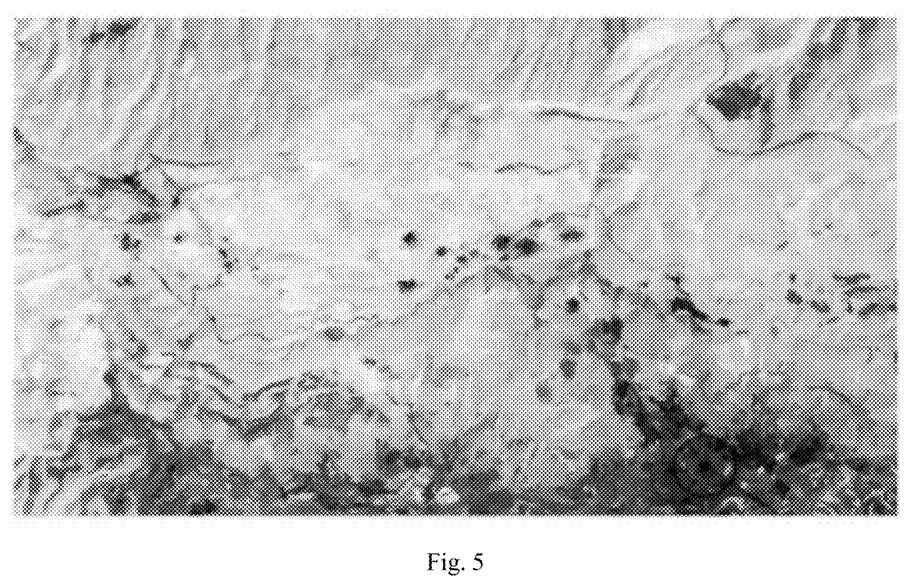
FIG. 5 is a NDBI analysis view of Jizu Mountain Scenic Area and surrounding areas according to an embodiment of the present invention.
Figure 6:
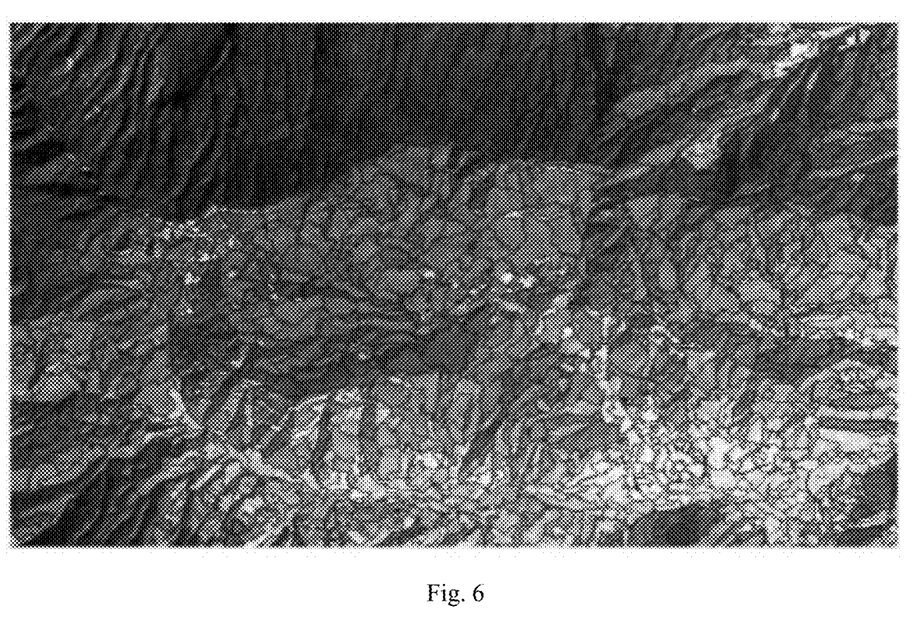
FIG. 6 is a remote sensing image (partial) of the Scenic Area at a segmentation scale of 20 according to an embodiment of the present invention.

Segmented patches with NDVI greater than a first threshold T1 are extracted as vegetation areas, while other patches as non-vegetation areas. The setting criterion for the first threshold T1 is that the vegetation areas and the non-vegetation areas can be distinguished in the current image, and the threshold is obtained by using a maximum interclass variance method (OTSU method) determined with an adaptive threshold. The calculated threshold is shown in FIG. 4, in which the black areas are vegetation areas, the white areas are non-vegetation areas, and the boundary lines between them are determined by the threshold. The threshold T1=0.1021 is obtained, and areas with NDVI greater than 0.1021 are set as vegetation areas, while areas with NDVI smaller than 0.1021 are set as non-vegetation areas, as shown in FIG. 5.

step S2: segmenting the non-vegetation areas by using a second scale parameter A2 to obtain patches of a second scale, calculating a normalized difference buildup index NDBI of each patch, and extracting building areas according to the NDBI;

Specifically, with reference to the image segmentation method in the step S1, the non-vegetation areas are segmented again by using a smaller scale parameter A2. The setting criterion for the second scale parameter A2 is that the segmented patches can be as large as possible without confusing the landscape building areas and the vegetation areas. The second scale parameter A2 is similar to the first scale parameter A1; it is possible to further divide A1 on the basis of A1 to divide the internal elements of A1 more clearly with a smaller scale. The segmentation threshold is interpreted for general areas with distinctive features in this case based on a human vision saliency mechanism. For example, the site is segmented and then observed, the areas with most segmentation elements in the site, i.e., the areas with all basic elements in the site in a patch, are taken as general areas, and a segmentation threshold range that has good segmentation separability for plants, buildings and water bodies is extracted, and the segmentation scale A2 in a range of 20 to 50, which has high adaptability to this step, is obtained. In this embodiment, the second scale parameter A2 is set to 20, as shown in FIG. 6.

For the patches after the second segmentation, the normalized difference buildup index NDBI of each patch in the non-vegetation areas is calculated. The calculation formula is as follows:

$$NDBI = \frac{NIR + R}{NIR - R}$$

wherein, NIR is the mean valve of the near infrared band of the current calculated patch, and R is the mean valve of the red band of the current calculated patch. By calculating the NDBI, the approximate locations of landscape buildings in the scenic area can be delineated. The obtained NDBI analysis map is shown in FIG. 5.

Figure 7:
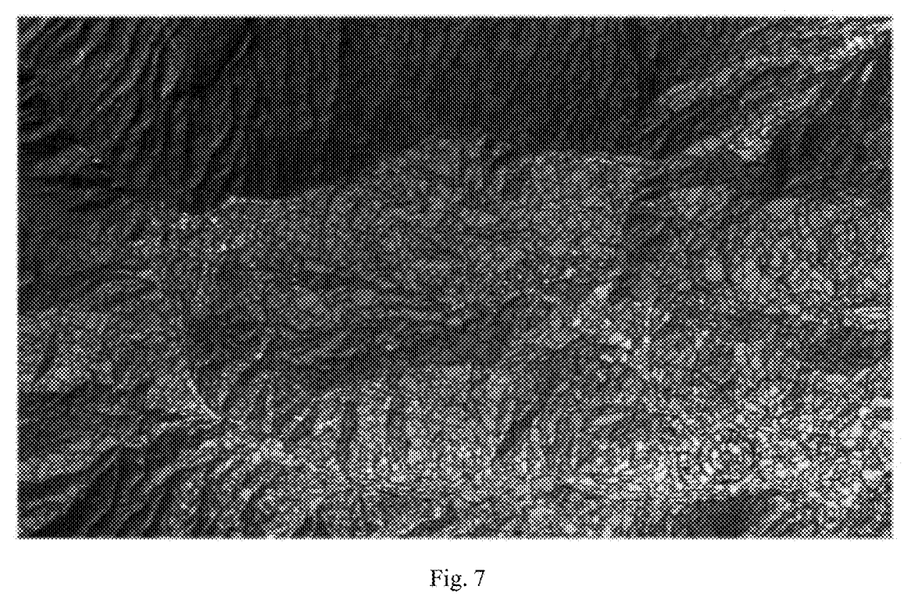
FIG. 7 is a remote sensing image (partial) of the Scenic Area at a segmentation scale of 10 according to an embodiment of the present invention.

Patches of the second scale with NDBI greater than a second threshold T2 are identified as building areas, while other patches as non-building areas. The second threshold T2 is similar to the first threshold T1. Compared with the vegetation areas and non-vegetation areas distinguished by T1, the value of T2 focuses on the threshold of separator between buildings and non-buildings in the non-vegetation areas. The value of separator between buildings and non-buildings is divided on a smaller scale with human vision saliency mechanism and OTSU method (see the step of T1 for the details). In this embodiment, T2=−0.4021 is obtained.

step S3: segmenting the non-vegetation areas again by using a third scale parameter A3 to obtain patches of a third scale, and calculating a normalized difference build shadow index NSBI of each patch;

Non-vegetation areas refer to the mixed areas of buildings and surrounding vegetations and shadows extracted in the step 2. Specifically, with reference to the image segmentation method in the step S1, in conjunction with the human vision saliency mechanism, the segmentation threshold is interpreted for general areas with distinguishing features in this case, and a segmentation scale A3 in a range of 5 to 10, which has high adaptability to this step, is obtained. The non-vegetation areas are segmented again by using a smaller scale parameter A3. The setting criterion for the third scale parameter A3 is that the segmented patches can be as large as possible without confusing the landscape building areas and the shadow areas. In this embodiment, A3 is set to 10, as shown in FIG. 7.

Figure 8:
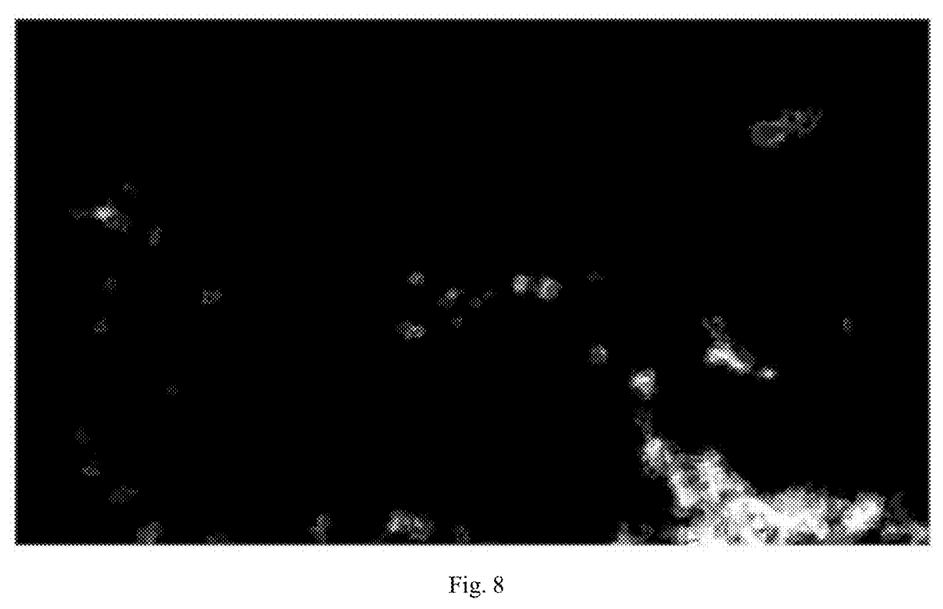
FIG. 8 is a NSBI analysis view of the landscape buildings and their surroundings according to an embodiment of the present invention.

The normalized difference build shadow index NSBI of each patch in the non-vegetation areas is calculated. For the non-vegetation areas, the influence of building areas and shadows and other interference items in the non-vegetation areas can be reduced. The calculation formula is as follows:

$$NSBI = NDBI * NIR = \frac{(NIR + R) * NIR}{NIR - R}$$

wherein, NIR is the mean valve of the near infrared band of the current calculated patch, and R is the mean valve of the red band of the current calculated patch. By introducing a near infrared band in the remote sensing image spectrum, in which there is a significant difference between shadows and non-shadows, the influence of large shadow areas in mountainous shady areas in the remote sensing image on the result of extraction is reduced. Based the normalized difference buildup index NDBI, NSBI introduces a near infrared spectral band (NIR band) that has a significant response to shadow changes, so as to improve the difference in NDBI between shadows and buildings in non-vegetation areas. The obtained NSBI analysis view is shown in FIG. 8.

step S4: calculating a NSBI separator $S_x(NSBI)$ of each patch according to the NSBI, and judging and extracting landscape buildings on the basis of the separator.

The NSBI separator $S_x(NSBI)$ of each patch in the non-vegetation areas is calculated with the following formula:

$$S_x(NSBI) = \frac{\sum_{x_i \in n(x), m_{x_i}(l) < m_x(l)} B(x, x_i)\left(m_x(NSBI) - m_{x_i}(NSBI)\right)}{\sum_{x_i \in n(x)} B(x, x_i)}$$

where, x represents the current calculated patch, n(x) represents a set of all patches adjacent to the current calculated patch, $B(x, x_i)$ is the length of a common side of the current calculated patch x and the adjacent patch $x_i$, and $m_x(NSBI)$ represents the NSBI value of the calculated patch x.

Figure 9:
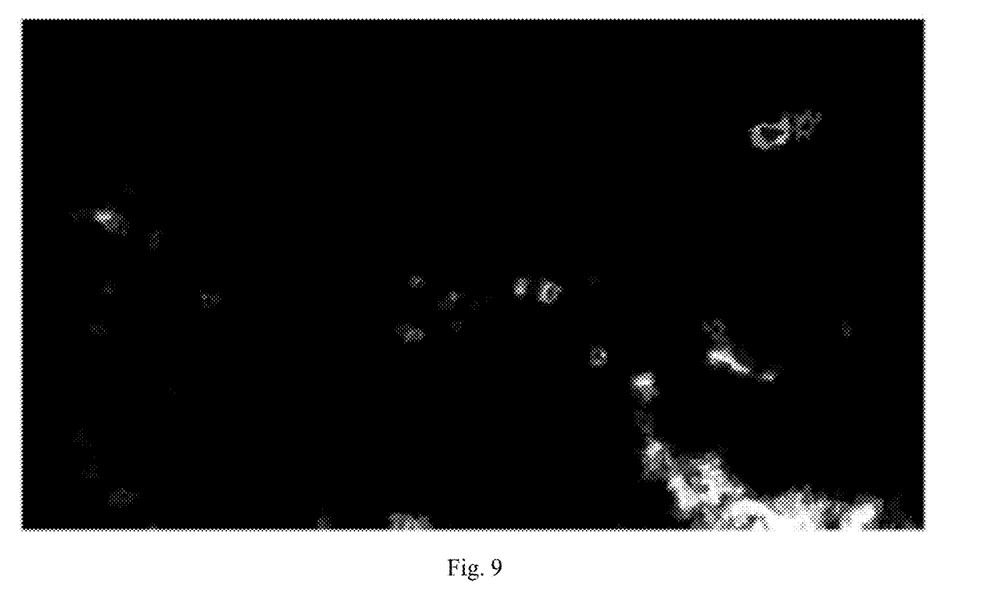
FIG. 9 is a NSBI characteristic value analysis view of the landscape buildings and their surroundings according to an embodiment of the present invention.

The $S_x(NSBI)$ separator enhances the NSBI relative difference between landscape patches and surrounding patches after segmentation, enhances the spectral relative difference between landscape buildings in bright areas, landscape buildings in shadow areas and shadow areas, and decreases the probability of spectral confusion, so that landscape buildings and adjacent patches can be distinguished significantly. FIG. 9 shows an analysis view of minimum extraction based on mixed areas of buildings and surrounding shadow areas.

Figure 10:
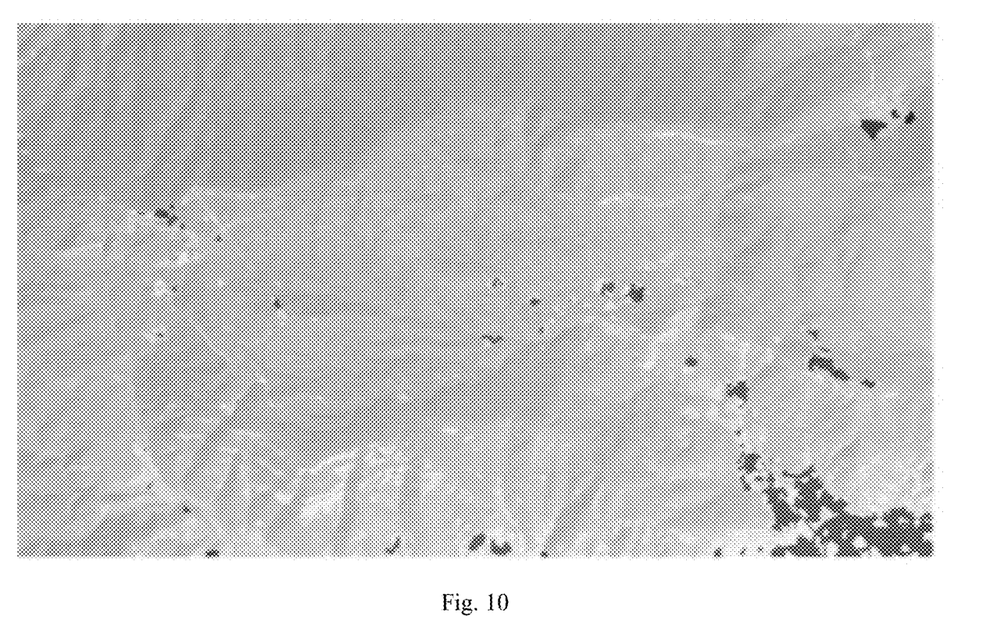
FIG. 10 shows the final result view of extraction of buildings in Jizu Mountain Scenic Area and surrounding areas according to an embodiment of the present invention.

Then, landscape building areas are extracted on the basis of the calculated NSBI separator $S_x(NSBI)$. Specifically, with reference to the image threshold interpretation method in the step S1, in conjunction with the human vision saliency mechanism, the extraction threshold is interpreted for general areas with distinguishing features in this case, an extraction threshold T3 which has high adaptability to this step is obtained. The scale parameter is used to obtain the smallest unit of analysis (as shown in FIGS. 2, 6 and 7), and the threshold here is used to extract boundary values of the NSBI separator $S_x(NSBI)$ analyzed in the smallest unit. In this embodiment, a separating threshold value T3=4.5732 between the landscape buildings and their adjacent shadows areas and the vegetation areas is obtained. The final extraction result is shown in FIG. 10. It can be seen that the present invention has strong extraction ability for landscape building settlements in scattered distribution.

Based on the same technical concept as the method embodiment, according to another embodiment of the present invention, a computer device is provided, which comprises: one or more processors; a memory unit; and one or more programs, which are stored in the memory unit and configured to be executed by the one or more processors, and when the program is executed by the processors, the steps in the method embodiment of the present invention is implemented.

The person skilled in the art should understand that the embodiments of the present application may be provided as a method, a system, or a computer program product. Therefore, the present application may be in the form of a pure hardware embodiment, a pure software embodiment, or a embodiment that combines the aspects of software and hardware. Furthermore, the present application may be in the form of a computer program product implemented on one or more computer-readable storage media that contain computer-readable program codes (including but not limited to disk storage, CD-ROM, optical storage, etc.).

The present application is described with reference to flow charts and/or block charts of the method, device (system) and computer program product according to the embodiments of the present application. It should be understood that each flow and/or block in the flow charts and/or block charts and combinations of the flows and/or blocks in the flow charts and/or block charts can be implemented by computer program instructions. These computer program instructions may be provided to a processor of a general-purpose computer, a special-purpose computer, an embedded processing device or any other programmable data processing device to produce a machine, so that the instructions, which are executed by the processor of the computer or other programmable data processing device, produce a device for implementing the functions specified by one or more flows in the flow charts and/or one or more blocks in the block charts.

These computer program instructions may also be stored in a computer-readable memory unit that can direct the computer or other programmable data processing device to operate in a specific manner, so that the instructions stored in the computer-readable memory unit produce a product including an instruction device which implements the functions specified by one or more flows in the flow charts and/or one or more blocks in the block charts.

These computer program instructions may also be loaded onto a computer or other programmable data processing device, so that a series of operational steps are performed on the computer or other programmable data processing device to produce a computer-implemented process, thus the instructions executed on the computer or other programmable data processing device provide steps for implementing the functions specified by one or more flows in the flow charts and/or one or more blocks in the block charts.

Finally, it should be noted that the above embodiments are only provided to explain the technical solution of the present invention, but do not constitute any limitation to the present invention. Although the present invention is described in detail with reference to the above embodiments, those of ordinary skill in the art should understand that various modifications or equivalent replacements may be made to the embodiments of the present invention without departing from the spirit and scope of the present invention, and all of such modifications or equivalent replacements shall be deemed as falling in the protection scope as defined by the claims of the present invention.

The invention claimed is:

1. A method for extracting mountain landscapes buildings based on high-resolution remote sensing images, comprising the following steps:
   S1: segmenting a remote sensing image into patches of a first scale by using a first scale parameter A1, calculating a normalized difference vegetation index NDVI of each patch, and extracting the segmented patches with NDVI greater than a first threshold T1 as vegetation areas, while other patches as non-vegetation areas;
   S2: segmenting the non-vegetation areas by using a second scale parameter A2 to obtain patches of a second scale, calculating a normalized difference buildup index NDBI of each patch, and judging the patches of the second scale with NDBI greater than a second threshold T2 as building areas, while regarding other patches as non-building areas;
   S3: segmenting the non-vegetation areas by using a third scale parameter A3 to obtain patches of a third scale, and calculating a normalized difference build shadow index NSBI of each patch;
   S4: calculating a normalized difference build shadow index separator $S_x(NSBI)$ of each patch according to the NSBI, and extracting the areas with a separator greater than a third threshold T3 as landscape buildings,
   wherein the normalized difference build shadow index separator Sx (NSBI) is calculated with the following formula:

$$S_x(NSBI) = \frac{\sum_{x_i \in n(x), m_{x_i}(l) < m_x(l)} B(x, x_i)(m_x(NSBI) - m_{x_i}(NSBI))}{\sum_{x_i \in n(x)} B(x, x_i)}$$

wherein, x represents the current calculated patch, n(x) represents a set of all patches adjacent to the current calculated patch, $B(x, x_i)$ is the length of a common side of the current calculated patch x and the adjacent patch $x_i$, and $m_x(NSBI)$ represents the NSBI value of the calculated patch x;
   wherein the first scale parameter A1>the second scale parameter A2>the third scale parameter A3.

2. The method for extracting mountain landscape buildings based on high-resolution remote sensing image according to claim 1, wherein the method uses the Multiresolution Segmentation algorithm or Hyper-pixel Segmentation algorithm to segment the image.

3. The method for extracting mountain landscape buildings based on high-resolution remote sensing image according to claim 1, wherein the normalized difference vegetation index NDVI in the step S1 is calculated with the following formula:

$$NDVI = \frac{NIR - R}{NIR + R}$$

wherein, NIR is the mean valve of the near infrared band of the current calculated patch, and R is the mean valve of the red band of the current calculated patch.

4. The method for extracting mountain landscape buildings based on high-resolution remote sensing image according to claim 1, wherein the normalized difference build shadow index NSBI in the step S2 is calculated with the following formula:

$$NDBI = \frac{NIR + R}{NIR - R}$$

wherein, NIR is the mean valve of the near infrared band of the current calculated patch, and R is the mean valve of the red band of the current calculated patch.

5. The method for extracting mountain landscape buildings based on high-resolution remote sensing image according to claim 1, wherein the normalized difference build shadow index NSBI of each patch is calculated with the following formula in the step S3:

$$NSBI = NDBI * NIR = \frac{(NIR + R) * NIR}{NIR - R}$$

wherein, NIR is the mean valve of the near infrared band of the current calculated patch, and R is the mean valve of the red band of the current calculated patch.

6. The method for extracting mountain landscape buildings based on high-resolution remote sensing image according to claim 1, wherein the first threshold T1, the second threshold T2 and the third threshold T3 are adaptively calculated with the OTSU method.

7. A computer device, comprising:
   one or more processors;
   a memory unit; and
   one or more programs, which are stored in the memory unit and configured to be executed by said one or more processors, and, when the program is configured to execute a method for extracting mountain landscapes buildings based on high-resolution remote sensing images, the method comprising the following steps:
   S1: segmenting a remote sensing image into patches of a first scale by using a first scale parameter A1, calculating a normalized difference vegetation index NDVI of each patch, and extracting the segmented patches with NDVI greater than a first threshold T1 as vegetation areas, while other patches as non-vegetation areas;
   S2: segmenting the non-vegetation areas by using a second scale parameter A2 to obtain patches of a second scale, calculating a normalized difference buildup index NDBI of each patch, and judging the patches of the second scale with NDBI greater than a second threshold T2 as building areas, while regarding other patches as non-building areas;
   S3: segmenting the non-vegetation areas by using a third scale parameter A3 to obtain patches of a third scale, and calculating a normalized difference build shadow index NSBI of each patch;
   S4: calculating a normalized difference build shadow index separator $S_x(NSBI)$ of each patch according to the NSBI, and extracting the areas with a separator greater than a third threshold T3 as landscape buildings, wherein the normalized difference build shadow index separator Sx (NSBI) is calculated with the following formula:

$$S_x(NSBI) = \frac{\sum_{x_i \in n(x), m_{x_i}(l) < m_x(l)} B(x, x_i)(m_x(NSBI) - m_{x_i}(NSBI))}{\sum_{x_i \in n(x)} B(x, x_i)}$$

wherein, x represents the current calculated patch, n(x) represents a set of all patches adjacent to the current calculated patch, $B(x, x_i)$ is the length of a common side of the current calculated patch x and the adjacent patch $x_i$, and $m_x$(NSBI) represents the NSBI value of the calculated patch x;
wherein the first scale parameter A1>the second scale parameter A2>the third scale parameter A3.

8. The device according to claim 7, wherein the method uses the Multiresolution Segmentation algorithm or Hyperpixel Segmentation algorithm to segment the image.

9. The device according to claim 7, wherein the normalized difference vegetation index NDVI in the step S1 is calculated with the following formula:

$$NDVI = \frac{NIR - R}{NIR + R}$$

wherein, NIR is the mean valve of the near infrared band of the current calculated patch, and R is the mean valve of the red band of the current calculated patch.

10. The device according to claim 7, wherein the normalized difference build shadow index NSBI in the step S2 is calculated with the following formula:

$$NDBI = \frac{NIR + R}{NIR - R}$$

wherein, NIR is the mean valve of the near infrared band of the current calculated patch, and R is the mean valve of the red band of the current calculated patch.

11. The device according to claim 7, wherein the normalized difference build shadow index NSBI of each patch is calculated with the following formula in the step S3:

$$NSBI = NDBI * NIR = \frac{(NIR + R) * NIR}{NIR - R}$$

wherein, NIR is the mean valve of the near infrared band of the current calculated patch, and R is the mean valve of the red band of the current calculated patch.

12. The device according to claim 7, wherein the first threshold T1, the second threshold T2 and the third threshold T3 are adaptively calculated with the OTSU method.

* * * * *